(12) United States Patent
Tarkin-Tas et al.

(10) Patent No.: US 11,279,824 B2
(45) Date of Patent: Mar. 22, 2022

(54) POLY(PHENYLENE ETHER) COPOLYMER COMPOSITIONS AND ASSOCIATED METHODS AND ARTICLES

(71) Applicant: SABIC GLOBAL TECHNOLOGIES B.V., Bergen op Zoom (NL)

(72) Inventors: Eylem Tarkin-Tas, Delmar, NY (US); Huseyin Tas, Delmar, NY (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 253 days.

(21) Appl. No.: 16/497,547

(22) PCT Filed: Mar. 27, 2018

(86) PCT No.: PCT/US2018/024429
§ 371 (c)(1),
(2) Date: Sep. 25, 2019

(87) PCT Pub. No.: WO2018/194797
PCT Pub. Date: Oct. 25, 2018

(65) Prior Publication Data
US 2020/0172729 A1   Jun. 4, 2020

Related U.S. Application Data

(60) Provisional application No. 62/488,180, filed on Apr. 21, 2017.

(51) Int. Cl.
*C08L 71/12* (2006.01)
*C08G 65/40* (2006.01)

(52) U.S. Cl.
CPC ........ *C08L 71/123* (2013.01); *C08G 65/4006* (2013.01)

(58) Field of Classification Search
CPC ..... C08F 20/06; C07D 303/12; C08G 81/025; C08G 65/4087; C07C 39/17
See application file for complete search history.

(56) References Cited

U.S. PATENT DOCUMENTS

| 3,306,874 | A  | 2/1967  | Hay            |
| 3,306,875 | A  | 2/1967  | Hay            |
| 3,789,054 | A  | 1/1974  | Izawa et al.   |
| 3,923,738 | A  | 12/1975 | Van Sorge      |
| 4,463,164 | A  | 7/1984  | Dalton et al.  |
| 6,962,744 | B2 | 11/2005 | Amagai et al.  |
| 7,541,421 | B2 | 6/2009  | Carrillo et al.|
| 7,638,566 | B2 | 12/2009 | Braidwood et al. |
| 8,058,359 | B2 | 11/2011 | Irwin          |
| 2005/0065241 | A1 | 3/2005 | Ishii et al.   |
| 2005/0070685 | A1 | 3/2005 | Mitsui et al.  |
| 2008/0071035 | A1 | 3/2008 | Delsman et al. |
| 2008/0076884 | A1 | 3/2008 | Yeager et al.  |
| 2008/0076885 | A1 | 3/2008 | Yeager et al.  |
| 2008/0085989 | A1 | 4/2008 | Yeager et al.  |
| 2008/0178983 | A1 | 7/2008 | Braidwood et al. |
| 2009/0012331 | A1 | 1/2009 | Nakano et al.  |
| 2015/0038667 | A1 | 2/2015 | Carrillo et al. |

FOREIGN PATENT DOCUMENTS

| EP | 0550209   | A2 | 7/1993  |
| JP | 60252649  | A  | 12/1985 |
| JP | 2008063537| A  | 3/2008  |
| WO | 2008036454| A1 | 3/2008  |
| WO | 2008103599| A3 | 8/2008  |

OTHER PUBLICATIONS

AICHE.org, [online]; www3.aiche.org/Proceedings/content/Annual-2013/extended-abstracts/P342189.pdf, E.N. Peters, A. Carrillo, S.M. Fisher, "Polyphenylene Ether Macromonomers," AICHE, Annual Proceed. P342189, 2013, 8 pages.
International Search Report; International Application No. PCT/US2018/024429; International Filing Date Mar. 27, 2018; dated Jul. 4, 2018; 5 pages.
International Search Report; International Application No. PCT/US2018/024432; International Filing Date Mar. 27, 2018; dated Jul. 4, 2018; 6 pages.
Liu et al.; "Mechanism of the Particle Formation During the Oxidative Polymerization of 2,6-Dimethylphenol in an Aqueous Medium"; Journal of Applied Polymer Science; vol. 104; pp. 3649-3653; (2007).
Saito et al.; "Oxidative Polymerization of 2,6-Dimethylphenol to Form Poly(2,6-dimethyl-1,4-phenyleneoxide) in Water"; Angew. Chem. Int. Ed. 2004; 43; pp. 730-733.
White et al.; "Polymerization by oxidative coupling. IV.Synthesis and Properties of Poly(2-methyl-6-phenylphenylene Ether)"; Journal of Polymer Science; Part A-1, Polymer Chemistry; vol. 10, No. 6; Jun. 1, 1972; pp. 1565-1578.

(Continued)

*Primary Examiner* — Shane Fang
(74) *Attorney, Agent, or Firm* — Cantor Colburn LLP

(57) ABSTRACT

A solution of a poly(phenylene ether) copolymer derived from 2-methyl-6-phenylphenol and a dihydric phenol in a non-halogenated solvent is useful in curable compositions. The copolymer has less than 0.5 weight percent monohydric phenols having identical substituents in the 2- and 6-positions of the phenolic ring, and an absolute number average molecular weight of 1,000 to 10,000 grams/mole. A solution of a poly(phenylene ether) copolymer derived from 2-methyl-6-phenylphenol, 2,6-dimethylphenol, and a dihydric phenol in a non-halogenated solvent is also useful in curable compositions. This copolymer has an absolute number average molecular weight of 1,000 to 5,000 grams/mole. A cured composition is obtained by heating curable compositions composed of the poly(phenylene ether) copolymer solutions and thermoset resins for a time and temperature sufficient to evaporate the non-halogenated solvent and effect curing. The compositions can be used for preparation of composites for printed circuit boards.

20 Claims, No Drawings

(56) References Cited

OTHER PUBLICATIONS

Written Opinion of the International Searching Authority; International Application No. PCT/US2018/024429; International Filing Date Mar. 27, 2018; dated Jul. 4, 2018; 8 pages.
Written Opinion of the International Searching Authority; International Application No. PCT/US2018/024432; International Filing Date Mar. 27, 2018; dated Jul. 4, 2018; 9 pages.

POLY(PHENYLENE ETHER) COPOLYMER COMPOSITIONS AND ASSOCIATED METHODS AND ARTICLES

CROSS REFERENCE TO RELATED APPLICATIONS

This application is a National Stage application of PCT/US2018/024429, filed Mar. 27, 2018, which claims the benefit of U.S. Provisional Application No. 62/488,180, filed Apr. 21, 2017, both of which are incorporated by reference in their entirety herein.

BACKGROUND

Thermoset resins, also known as "thermosetting" resins, are used in a wide variety of consumer and industrial products including protective coatings, adhesives, electronic laminates (such as those used in the fabrication of printed circuit boards), flooring and paving, glass fiber-reinforced pipes, and automotive parts (including leaf springs, pumps, and electrical components). Relative to other types of plastics, cured thermoset resins are more brittle. It is therefore desirable to improve the toughness of thermoset resins while maintaining their good properties.

Poly(phenylene ether)s have been used in thermoset resin compositions for electronics applications, for example in printed circuit boards, where they provide improved toughness and dielectric properties. For example, certain poly(phenylene ether)s have been used with thermoset resins such as epoxies, cyanate esters, bismaleimides, benzoxazines, and acrylates. Curable poly(phenylene ether)-containing compositions are often diluted with solvents to reduce viscosity and to facilitate wetting and impregnation of fillers and/or reinforcements. These compositions can be used in varnishes to make laminates for printed circuit boards. Non-chlorinated hydrocarbon solvents are preferred. However, the use of non-chlorinated hydrocarbon solvents such as N-methyl-2-pyrrolidone (NMP) and methyl ethyl ketone (MEK) result in phase-separated mixtures with most poly(phenylene ether)s at room temperature. Although elevated temperatures will promote dissolution of the poly(phenylene ether)s, elevated temperatures are associated with increased solvent flammability, increased solvent emissions, and increased energy costs. It is also desirable to use concentrated solutions of poly(phenylene ether)s to maximize the amount of poly(phenylene ether) added to a curable composition while minimizing the amount of solvent. Furthermore, in order to facilitate distribution of concentrated poly(phenylene ether) solutions via truck and rail, the solutions should withstand exposure to freezing and sub-freezing temperatures without forming precipitates.

There is therefore a need to stable concentrated solutions of poly(phenylene ether)s in non-halogenated solvents such as NMP and MEK. Moreover, the concentrated solutions can be resistant to phase separation and precipitation, and can have low solution viscosity at and below room temperature. Such concentrated solutions can be used in varnishes to make laminates for printed circuit boards.

BRIEF SUMMARY OF EMBODIMENTS

A composition useful in curable compositions comprises a poly(phenylene ether) copolymer derived from monomers comprising 2-methyl-6-phenylphenol and a dihydric phenol; and a non-halogenated solvent; wherein the monomers comprise, based on the total weight of monomers, less than 0.5 weight percent of monohydric phenols having identical substituents in the 2- and 6-positions of the phenolic ring; and wherein the copolymer has an absolute number average molecular weight of 1,000 to 10,000 grams/mole.

Another composition useful in curable compositions comprises a poly(phenylene ether) copolymer derived from monomers comprising 2-methyl-6-phenylphenol, 2,6-dimethylphenol, and a dihydric phenol; and a non-halogenated solvent; wherein the copolymer has an absolute number average molecular weight of 1,000 to 5,000 grams/mole.

A curable composition comprises a thermoset resin and the poly(phenylene ether) copolymer compositions described herein. A cured composition is obtained by heating the curable compositions for a time and temperature sufficient to evaporate the non-halogenated solvent and effect curing. A method of forming a composite comprises impregnating a reinforcing structure with the curable composition described herein; removing at least a portion of the non-halogenated solvent from the curable composition and effecting partial cure to form a prepreg; and laminating and curing a plurality of the prepregs. A composite so formed is useful in printed circuit boards.

These and other embodiments are described in detail below.

DETAILED DESCRIPTION

The present inventors have determined that oligomeric bifunctional poly(phenylene ether) copolymers derived from 2-methyl-6-phenylphenol have increased solubility in non-halogenated solvents and lower solution viscosity than oligomeric bifunctional poly(phenylene ether) copolymers in which the 2-methyl-6-phenylphenol is partially or completely replaced by 2,6-dimethylphenol. With this improvement, stable concentrated solutions of bifunctional poly(phenylene ether)s copolymers in non-halogenated solvents having reduced viscosity can be made. Moreover, the concentrated solutions are expected to be more resistant to phase separation and precipitation at and below room temperature. Advantageously, these concentrated solutions can be used in varnishes to make laminates for printed circuit boards.

An embodiment of the oligomeric bifunctional poly(phenylene ether) copolymer solution is a composition comprising a poly(phenylene ether) copolymer derived from monomers comprising 2-methyl-6-phenylphenol and a dihydric phenol; and a non-halogenated solvent; wherein the monomers comprise, based on the total weight of monomers, less than 0.5 weight percent of monohydric phenols having identical substituents in the 2- and 6-positions of the phenolic ring; and wherein the copolymer has an absolute number average molecular weight of 1,000 to 10,000 grams/mole.

In some embodiments, the monomers further comprise 2,6-dimethylphenol. For example, the composition can comprise a poly(phenylene ether) copolymer derived from monomers comprising 2-methyl-6-phenylphenol, 2,6-dimethylphenol, and a dihydric phenol; and a non-halogenated solvent; wherein the copolymer has an absolute number average molecular weight of 1,000 to 5,000, 1,000 to 4,000, or 1,000 to 3,000 grams/mole.

In some embodiments, the composition described herein comprises: 15 to 80 weight percent of the poly(phenylene ether) copolymer; and 20 to 85 weight percent of the non-halogenated solvent, based on the total weight of the poly(phenylene ether) copolymer and the non-halogenated solvent. Within this range, the composition can comprise greater than or equal to 20 or 30 weight percent and less than or equal to 70, 60, or 50 weight percent of poly(phenylene ether) copolymer and greater than or equal to 30, 40, or 50 weight percent and less than or equal to 80 or 70 weight percent of non-halogenated solvent.

In some embodiments, the dihydric phenol has the structure:

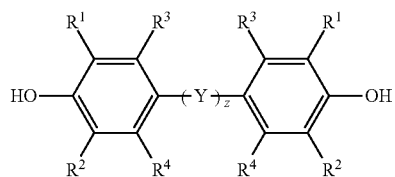

wherein each occurrence of $R^1$ and $R^2$ and $R^3$ and $R^4$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; z is 0 or 1; and Y is:

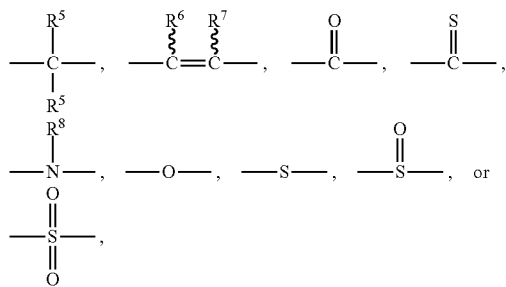

wherein each occurrence of $R^5$-$R^8$ is independently hydrogen, $C_1$-$C_{12}$ hydrocarbyl, or $C_1$-$C_6$ hydrocarbylene wherein the two occurrences of $R^5$ collectively form a $C_4$-$C_{12}$ alkylene group. Examples of dihydric phenols include 3,3', 5,5'-tetramethyl-4,4'-biphenol, 2,2-bis(3-methyl-4-hydroxyphenyl)propane, 2,2-bis(3,5-dimethy-4-hydroxyphenyl)propane, 1,1-bis(4-hydroxyphenyl)methane, 1, 1-bis(4-hydroxyphenyl)ethane, 2,2-bis(4-hydroxyphenyl)propane, 2,2-bis(4-hydroxyphenyl)butane, 2,2-bis(4-hydroxyphenyl) octane, 1,1-bis(4-hydroxyphenyl)propane, 1,1-bis(4-hydroxyphenyl)-n-butane, bis(4-hydroxyphenyl)phenylmethane, 2,2-bis(4-hydroxy-3-methylphenyl)propane, 1,1-bis(4-hydroxy-3-methylphenyl)cyclohexane, 1,1-bis(4-hydroxy-3,5-dimethylphenyl)cyclopentane, 1,1-bis(4-hydroxy-3,5-dimethylphenyl)cyclohexane, 1,1-bis(4-hydroxy-3-methylphenyl)cycloheptane, 1,1-bis(4-hydroxy-3,5-dimethylphenyl)cycloheptane, 1,1-bis(4-hydroxy-3-methylphenyl)cyclooctane, 1,1-bis(4-hydroxy-3,5-dimethylphenyl)cyclooctane, 1,1-bis(4-hydroxy-3-methylphenyl)cyclononane, 1,1-bis(4-hydroxy-3,5-dimethylphenyl)cyclononane, 1,1-bis(4-hydroxy-3-methylphenyl)cyclodecane, 1,1-bis(4-hydroxy-3,5-dimethylphenyl)cyclodecane, 1,1-bis(4-hydroxy-3-methylphenyl)cycloundecane, 1,1-bis(4-hydroxy-3,5-dimethylphenyl)cycloundecane, 1,1-bis(4-hydroxy-3-methylphenyl)cyclododecane, 1,1-bis(4-hydroxy-3,5-dimethylphenyl)cyclododecane, 1,1-bis(4-hydroxy-3-t-butylphenyl)propane, 2,2-bis(4-hydroxy-2,6-dimethylphenyl)propane, 2,2-bis(4-hydroxy-3-bromophenyl)propane, 1,1-bis(4-hydroxyphenyl) cyclopentane, 1,1-bis(4-hydroxyphenyl)cyclohexane, 2,2',6,6'-tetramethyl-3,3',5,5'-tetrabromo-4,4'-biphenol, 2,2',5,5'-tetramethyl-4,4'-biphenol or a combination comprising at least one of the foregoing.

In some embodiments of the dihydric phenol, z is 1. In some embodiments, Y is:

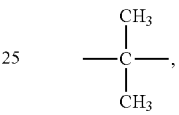

z is 1, each occurrence of $R^3$ and $R^4$ is hydrogen, and each occurrence of $R^1$ and $R^2$ is methyl, and the dihydric phenol comprises 2,2-bis(3,5-dimethyl-4-hydroxyphenol)propane.

In some embodiments, the monomers comprise, based on the total weight of the monomers, less than 0.5 weight percent of monohydric phenols having identical substituents in the 2- and 6-positions of the phenolic ring. Within this range, the monomers can comprise, less than 0.4, 0.3. 0.2, or 0.1 weight percent of monohydric phenols having identical substituents in the 2- and 6-positions of the phenolic ring. The monomers can comprise no monohydric phenols having identical substituents in the 2- and 6-positions of the phenolic ring. The monohydric phenol having identical substituents in the 2- and 6-positions of the phenolic ring can be 2,6-dimethylphenol.

An example of a poly(phenylene ether) copolymer comprising no monohydric phenols having identical substituents in the 2- and 6-positions of the phenolic ring has the structure:

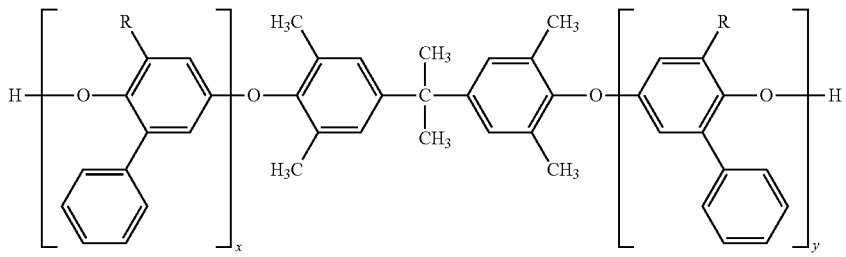

wherein R is independently at each occurrence methyl or di(n-butyl)aminomethyl; provided that the copolymer comprises, on average, less than or equal to 0.005 weight percent of di(n-butyl)aminomethyl groups, based on the weight of the copolymer; and x and y are independently integers from zero to 50, provided that the sum of x plus y is 4 to 53. In some embodiments of this poly(phenylene ether) copolymer, the sum of x and y is 8 to 20.

The poly(phenylene ether) copolymer can have an absolute number average molecular weight of 1,000 to 10,000 grams/mole. Within this range, the poly(phenylene ether) copolymer can have an absolute number average molecular weight of 1,000 to 8,000, 1,000 to 5,000, 1,000 to 4,000, or 1,000 to 3,000 grams/mole. In some embodiments, the absolute number average molecular weight is 1,000 to 3,000 grams/mole. For example, when the composition comprises a poly(phenylene ether) copolymer derived from monomers comprising 2-methyl-6-phenylphenol, 2,6-dimethylphenol, and a dihydric phenol; and a non-halogenated solvent; the copolymer can have an absolute number average molecular weight of 1,000 to 3,000 grams/mole. Absolute number average molecular weight is determined by $^1$H-NMR as described in the Working Examples section. It is calculated from the integrated areas under the resonance peaks in $^1$H-NMR spectra of the poly(phenylene ether) copolymers, which are proportional to the molar concentration of the species corresponding to the peaks.

Advantageously, the composition further comprises a non-halogenated solvent. A non-halogenated solvent is a hydrocarbon solvent that does not contain any fluorine, chlorine, bromine, or iodine atoms. Although halogenated solvents like methylene chloride, chloroform, 1,1,1-trichloroethane, and chlorobenzene can be effective solvents for thermoset resins, they are undesirable for health, safety, and environmental reasons. The non-halogenated solvent comprises $C_3$-$C_8$ ketones, $C_4$-$C_8$ N,N-dialkylamides, $C_4$-$C_{16}$ dialkyl ethers, $C_6$-$C_{12}$ aromatic hydrocarbons, $C_3$-$C_6$ alkyl alkanoates, $C_2$-$C_6$ alkyl nitriles, $C_2$-$C_6$ dialkyl sulfoxides, or a combination comprising at least one of the foregoing. The non-halogenated solvent can be acyclic or cyclic. The carbon number ranges refer to the total number of carbon atoms in the solvent molecule and includes carbon atoms in functional groups. For example, the 2 to 6 carbon atoms in $C_2$-$C_6$ alkyl cyanides include the carbon atom in the cyanide group. $C_4$-$C_{16}$ dialkyl ethers have 4 to 16 total carbon atoms, and the two alkyl groups can be the same or different. Examples of $C_3$-$C_8$ ketones include acetone, methyl ethyl ketone, methyl isobutyl ketone, and combinations comprising at least one of the foregoing. Examples of $C_4$-$C_8$ N,N-dialkylamides include dimethylformamide, dimethylacetamide, N-methyl-2-pyrrolidone, and combinations comprising at least one of the foregoing. Examples of $C_4$-$C_{16}$ dialkyl ethers include tetrahydrofuran, dioxane, and combinations comprising at least one of the foregoing. The $C_4$-$C_{16}$ dialkyl ether can optionally further include one or more ether oxygen atoms within the alkyl groups and one or more hydroxy substituents on the alkyl groups, for example the $C_4$-$C_{16}$ dialkyl ether can be ethylene glycol monomethyl ether. The aromatic hydrocarbon solvent can be an ethylenically unsaturated solvent. Examples of $C_6$-$C_{12}$ aromatic hydrocarbons include benzene, toluene, xylenes, styrene, divinylbenzenes, and combinations comprising at least one of the foregoing. Examples of $C_3$-$C_6$ alkyl alkanoates include methyl acetate, ethyl acetate, methyl propionate, ethyl propionate, and combinations comprising at least one of the foregoing. Examples of $C_2$-$C_6$ alkyl cyanides include acetonitrile, propionitrile, butyronitrile, and combinations comprising at least one of the foregoing. Examples of $C_2$-$C_6$ dialkyl sulfoxides include dimethyl sulfoxide, methyl ethyl sulfoxide, diethyl sulfoxide, and combinations comprising at least one of the foregoing. In some embodiments, the non-halogenated solvent comprises acetone, methyl ethyl ketone, N-methyl-2-pyrrolidone, toluene, or a combination comprising at least one of the foregoing.

The poly(phenylene ether) copolymer is formed by polymerization of monomers comprising 2-methyl-6-phenylphenol and dihydric phenol by continuous addition of oxygen to a reaction mixture comprising the monomers, solvent, and polymerization catalyst. The molecular oxygen ($O_2$) can be provided as air or pure oxygen. The polymerization catalyst is a metal complex comprising a transition metal cation. The metal cation can include ions from Group VIB, VIIB, VIIIB, or IB of the periodic table, and combinations thereof. Of these, chromium, manganese, cobalt, copper, and combinations comprising at least one of the foregoing ions can be used. In some embodiments, the metal ion is copper ion ($Cu^+$ and $Cu^{2+}$). Metal salts which can serve as sources of metal cations include cuprous chloride, cupric chloride, cuprous bromide, cupric bromide, cuprous iodide, cupric iodide, cuprous sulfate, cupric sulfate, cuprous tetraamine sulfate, cupric tetraamine sulfate, cuprous acetate, cupric acetate, cuprous propionate, cupric butyrate, cupric laurate, cuprous palmitate, cuprous benzoate, and the corresponding manganese salts and cobalt salts. Instead of use of any of the above-exemplified metal salts, it is also possible to add a metal or a metal oxide and an inorganic acid, organic acid or an aqueous solution of such an acid and form the corresponding metal salt or hydrate in situ. For example, cuprous oxide and hydrobromic acid can be added to generate cuprous bromide in situ.

The polymerization catalyst further comprises at least one amine ligand. The amine ligand can be, for example, a monoamine, an alkylene diamine, or a combination comprising at least one of the foregoing. Monoamines include dialkylmonoamines (such as di-n-butylamine, or DBA) and trialkylmonoamines (such as N,N-dimethylbutylamine, or DMBA). Diamines include alkylenediamines, such as N,N'-di-tert-butylethylenediamine, or DBEDA. Suitable dialkylmonoamines include dimethylamine, di-n-propylamine, di-n-butylamine, di-sec-butyl amine, di-tert-butylamine, dipentylamine, dihexylamine, dioctylamine, didecylamine, dibenzylamine, methylethylamine, methylbutylamine, dicyclohexylamine, N-phenylethanolamine, N-(p-methyl)phenylethanolamine, N-(2,6-dimethyl)phenylethanolamine, N-(p-chloro)phenylethanolamine, N-ethylaniline, N-butyl aniline, N-methyl-2-methylaniline, N-methyl-2,6-dimethyl-aniline, diphenylamine, and the like, and combinations thereof. Suitable trialkylmonoamines include trimethylamine, triethylamine, tripropylamine, tributylamine, butyldimethylamine, phenyldiethylamine, and the like, and combinations thereof.

Suitable alkylenediamines include those having the formula:

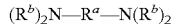

wherein $R^a$ is a substituted or unsubstituted divalent residue; and each $R^b$ is independently hydrogen or $C_1$-$C_8$ alkyl. In some examples, of the above formula, two or three aliphatic carbon atoms form the closest link between the two diamine nitrogen atoms. Specific alkylenediamine ligands include those in which $R^a$ is dimethylene (—$CH_2CH_2$—) or trimethylene (—$CH_2CH_2CH_2$—). $R^b$ can be independently hydrogen, methyl, propyl, isopropyl, butyl, or a $C_4$-$C_8$ alpha-tertiary alkyl group. Examples of alkylenediamine ligands include N,N,N',N' tetramethylethylene diamine (TMED), N,N'-di-tert-butylethylenediamine (DBEDA), N,N,N',N'-tetramethyl-1,3-diaminopropane (TMPD), N-methyl-1,3-diaminopropane, N,N'-dimethyl-1,3-diaminopropane, N,N,N'-dimethyl-1,3-diaminopropane, N-ethyl-1, 3-diaminopropane, N-methyl-1,4-diaminobutane, N,N'-trimethyl-1,4-diaminobutane, N,N,N'-trimethyl-1,4-diaminobutane, N,N,N',N'-tetramethyl-1,4-diaminobutane, N,N,N',N'-tetramethyl-1,5-diaminopentane, and combinations thereof. In some embodiments, the amine ligand is di-n-butylamine (DBA), N,N-dimethylbutylamine (DMBA), N,N'-di-tert-butylethylenediamine (DBEDA), or combinations thereof. The catalyst can be prepared in situ by mixing a metal ion source (e.g., cuprous oxide and hydrobromic acid) and amine ligands. In some embodiments, the polymerization catalyst comprises copper ion, bromide ion, and N,N'-di-tert-butylethylenediamine.

In some embodiments, the poly(phenylene ether) copolymer has a solubility of at least 100 grams per kilogram, based on the total weight of the copolymer and non-halogenated solvent, at 25° C. Within this range, the poly(phenylene ether) copolymer can have a solubility of at least 200, 300, 400, 500, or 600 grams per kilogram at 25° C. In some embodiments, the poly(phenylene ether) copolymer has a solubility of 100 to 700 grams per kilogram, based on the total weight of the copolymer and non-halogenated solvent, at 25° C. Within this range, the poly(phenylene ether) copolymer can have a solubility of 200, 300, 400, 500, or 600 grams per kilogram to 700 grams per kilogram at 25° C. In some embodiments, the solubility is measured in toluene, methyl ethyl ketone, or N-methyl-2-pyrrolidone at 25° C. The solubility of the poly(phenylene ether) copolymer can be determined according to a modified version of ASTM D3132-84, Standard Test Method of Solubility Range of Resins and Polymers (Reapproved 1996; Withdrawn 2005) as described in the Working Examples section.

Being bifunctional, with two reactive phenolic groups, the poly(phenylene ether) copolymer is ideally suited as a reactive component in curable compositions comprising a thermoset resin. Thus a curable composition comprises a thermoset resin, the poly(phenylene ether) copolymer, and a non-halogenated solvent. The thermoset resin can be, for example, an epoxy resin, a cyanate ester resin, a bismaleimide resin, a polybenzoxazine resin, a vinyl resin, a phenolic resin, an alkyd resin, an unsaturated polyester resin, or a combination comprising at least one of the foregoing thermoset resins. Epoxy resins useful as thermoset resins can be produced by reaction of phenols or polyphenols with epichlorohydrin to form polyglycidyl ethers. Examples of useful phenols for production of epoxy resins include substituted bisphenol A, bisphenol F, hydroquinone, resorcinol, tris-(4-hydroxyphenyl)methane, and novolac resins derived from phenol or o-cresol. Epoxy resins can also be produced by reaction of aromatic amines, such as p-aminophenol or methylenedianiline, with epichlorohydrin to form polyglycidyl amines.

Epoxy resins can be converted into solid, infusible, and insoluble three dimensional networks by curing with cross-linkers, often called curing agents, or hardeners. Curing agents are either catalytic or coreactive. Coreactive curing agents have active hydrogen atoms that can react with epoxy groups of the epoxy resin to form a cross-linked resin. The active hydrogen atoms can be present in functional groups comprising primary or secondary amines, phenols, thiols, carboxylic acids, or carboxylic acid anhydrides. Examples of coreactive curing agents for epoxy resins include aliphatic and cycloaliphatic amines and amine-functional adducts with epoxy resins, Mannich bases, aromatic amines, polyamides, amidoamines, phenalkamines, dicyandiamide, polycarboxylic acid-functional polyesters, carboxylic acid anhydrides, amine-formaldehyde resins, phenol-formaldehyde resins, polysulfides, polymercaptans, and combinations comprising at least one of the foregoing coreactive curing agents. A catalytic curing agent functions as an initiator for epoxy resin homopolymerization or as an accelerator for coreactive curing agents. Examples of catalytic curing agents include tertiary amines, such as 2-ethyl-4-methylimidazole, Lewis acids, such as boron trifluoride, and latent cationic cure catalysts, such as diaryliodonium salts.

The thermoset resin can be a cyanate ester. Cyanate esters are compounds having a cyanate group (—O—C≡N) bonded to carbon via the oxygen atom, i.e. compounds with C—O—C≡N groups. Cyanate esters useful as thermoset resins can be produced by reaction of a cyanogen halide with a phenol or substituted phenol. Examples of useful phenols include bisphenols utilized in the production of epoxy resins, such as bisphenol A, bisphenol F, and novolac resins based on phenol or o-cresol. Cyanate ester prepolymers are prepared by polymerization/cyclotrimerization of cyanate esters. Prepolymers prepared from cyanate esters and diamines can also be used. The thermoset resin can be a bismaleimide. Bismaleimide resins can be produced by reaction of a monomeric bismaleimide with a nucleophile such as a diamine, aminophenol, or amino benzhydrazide, or by reaction of a bismaleimide with diallyl bisphenol A. The thermoset resin can be a vinyl resin. A vinyl resin is a monomer or polymer having ethylenic unsaturation. Examples of vinyl resins include unsaturated polyesters, styrenic monomers, (meth)acrylates, allyl ethers, vinyl ethers, and combinations comprising at least one of the foregoing.

In some embodiments, the curable composition comprises the poly(phenylene ether) copolymer described herein, a non-halogenated solvent, and an epoxy resin, and the composition is free of coreactive curing agent other than the poly(phenylene ether) copolymer. This curable composition can comprise 20 to 99 weight percent of the epoxy resin and 1 to 80 weight percent of the poly(phenylene ether) copolymer, based on the total weight of the epoxy resin and the poly(phenylene ether) copolymer.

A cured composition is obtained by heating the curable composition defined herein for a time and temperature sufficient to evaporate the non-halogenated solvent and effect curing. In curing, a cross-linked, three-dimensional polymer network is formed. For certain thermoset resins, for example (meth)acrylate resins, curing can also take place by irradiation with actinic radiation at a sufficient wavelength and time.

The curable composition described herein is particularly well suited for use in forming composites used in printed circuit boards. Methods of forming composites for use in printed circuit boards are described in, for example, U.S. Pat. No. 5,622,588 to Weber, U.S. Pat. No. 5,582,872 to Prinz, and U.S. Pat. No. 7,655,278 to Braidwood. A method of forming a composite comprises impregnating a reinforcing structure with the curable composition described herein; partially curing and removing at least a portion of the non-halogenated solvent from the curable composition to form a prepreg; and laminating and curing a plurality of the prepregs.

Reinforcing structures suitable for prepreg formation are known in the art. Suitable reinforcing structures include reinforcing fabrics. Reinforcing fabrics include those having complex architectures, including two- or three-dimensional braided, knitted, woven, and filament wound. The curable composition is capable of permeating these reinforcing structures. The reinforcing structure can comprise fibers of materials known for the reinforcement of plastics, for example fibers of carbon, glass, metal, and aromatic polyamides. Suitable reinforcing structures are described, for example, in Anonymous (Hexcel Corporation), "Prepreg Technology", March 2005, Publication No. FGU 017b; Anonymous (Hexcel Corporation), "Advanced Fibre Reinforced Matrix Products for Direct Processes", June 2005, Publication No. ITA 272; and Bob Griffiths, "Farnborough Airshow Report 2006", CompositesWorld.com, September 2006. The weight and thickness of the reinforcing structure are chosen according to the intended use of the composite using criteria well known to those skilled in the production of fiber reinforced resin composites. The reinforced structure can contain various finishes compatible with the thermoset resin.

The method of forming the composite comprises partially curing the curable composition, also known as a varnish, after the reinforcing structure has been impregnated with it. Partial curing is curing sufficient to reduce or eliminate the wetness and tackiness of the curable composition yet insufficient to fully cure the composition. The thermoset resin in a prepreg is customarily partially cured. References herein to a "cured composition" refer to a composition that is fully cured. The thermoset resin in a laminate formed from prepregs is fully cured. The skilled person can readily determine whether a composition is partially cured or fully cured without undue experimentation. For example, one can analyze a sample by differential scanning calorimetry to look for an exotherm indicative of additional curing occurring during the analysis. A sample that is partially cured will exhibit an exotherm. A sample that is fully cured will exhibit little or no exotherm. Partial curing can be effected by subjecting an reinforcing structure impregnated with thermoset resin to a temperature of about 133 to about 140° C. for about 4 to about 10 minutes.

The curable compositions described herein are readily adaptable to existing commercial-scale processes and equipment. For example, prepregs are often produced on treaters. The main components of a treater include feeder rollers, a resin impregnation tank, a treater oven, and receiver rollers. The reinforcing structure (E-glass, for example) is usually rolled into a large spool. The spool is then put on the feeder rollers that turn and slowly roll out the reinforcing structure. The reinforcing structure then moves through the resin impregnation tank, which contains the curable composition (varnish). The varnish impregnates the reinforcing structure. After emerging from the tank, the coated reinforcing structure moves upward through a vertical treater oven, which is at a temperature of about 175 to about 200° C., and the solvent of the varnish is boiled away. The thermoset resin begins to polymerize at this time. When the composite comes out of the tower it is sufficiently cured so that the resulting web is not wet or tacky. However curing is stopped short of completion so that additional curing can occur when the laminate is made. The web then rolls the prepreg onto a receiver roll. Thus in some embodiments, a composite is formed by impregnating a reinforcing structure with the curable composition described herein; removing at least a portion of the non-halogenated solvent from the curable composition and effecting partial cure to form a prepreg; and laminating and curing a plurality of prepregs. The composites described herein can be used for the manufacture of printed circuit boards. Thus, a printed circuit board comprises a composite formed by impregnating a reinforcing structure with the curable composition described herein; removing at least a portion of the non-halogenated solvent from the curable composition and effecting partial cure to form a prepreg; and laminating and curing a plurality of the prepregs.

Due to the presence of the poly(phenylene ether) copolymer, the cured compositions and composites described herein can have any of several beneficial physical properties that are useful in various articles, in particular printed circuit boards, including good impact strength, hydrolytic stability, low moisture absorption, high $T_g$, and good dielectric properties.

The disclosure is further illustrated by the following examples, which are not intended to limit the claims.

WORKING EXAMPLES

Materials used in the working examples are described in Table 1.

TABLE 1

| Component | Description |
|---|---|
| PPE-DMP | 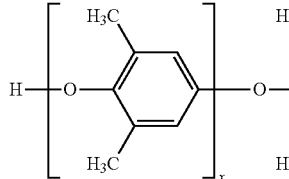 obtained as NORYL ™ SA90 from SABIC Innovative Plastics. |
| DMP | 2,6-Dimethylphenol (2,6-xylenol); C.A.S. Reg. No. 576,26-1; obtained from SigmaAldrich. |
| MPP | 2-Methyl-6-phenylphenol, CAS Reg. No. 17755-10-1; obtained from SI Group, Inc. |
| TMBPA | 2,2-bis(3,5-dimethyl-4-hydroxyphenyl)propane, CAS Reg. No. 5613-46-7; obtained from Deepak Novochem. |
| Cu$_2$O | Cuprous oxide, CAS Reg. No. 1317-39-1; obtained from American Chemet Corporation. |
| HBr | Hydrobromic acid, CAS Reg. No. 10035-10-6; obtained from Chemtura Corporation. |
| DBEDA | Di-tert-butylethylenediamine, CAS Reg. No. 4062-60-6; obtained from Achiewell, LLC. |
| DBA | Di-n-butylamine, CAS Reg. No. 111-92-2; obtained from Oxea. |
| DMBA | N,N-Dimethylbutylamine, CAS Reg. No. 927-62-8; obtained from Oxea. |
| DDMAC | N,N,N',N'-Didecyldimethyl ammonium chloride, CAS Reg. No. 7173-51-5; obtained as MAQUAT™ 4450T from Mason Chemical Company. |

TABLE 1-continued

| Component | Description |
|---|---|
| Na₃NTA | Nitrilotriacetic acid trisodium salt, CAS Reg. No. 5064-31-3; obtained from Akzo Nobel Functional Chemicals, LLC. |
| MEK | Methyl ethyl ketone, CAS Reg. No. 78-93-3; obtained from Fisher Scientific. |
| Methanol | Methanol, CAS Reg. No. 67-56-1; obtained from Fisher Scientific. |
| Toluene | Toluene, CAS Reg. No. 108-88-3; obtained from Fisher Scientific. |
| Chloroform | Chloroform, CAS Reg. No. 67-66-3; obtained from Fisher Scientific. |
| BPADGE | D.E.R. ™ 332 Liquid Epoxy Resin, bisphenol A diglycidyl ether, CAS Reg. No. 1675-54-3; obtained from Dow Chemicals. |
| 2,4-EMI | 2-Ethyl-4-methylimidazole, CAS Reg. No. 931-36-2; obtained from Acros. |
| E-Glass | E-Glass 7628 woven glass fabric having a warp and fill count of 44 x 32 ends/inch and a thickness of 0.0056 inches (0.140 millimeters). |

Preparative Example 1—Synthesis of Bifunctional MPP Copolymer

Copolymerization was carried out in a Mettler Toledo RC1e bubbling reactor, Type 3, 1.8 liters, 100 bar, equipped with a stirrer, temperature control system, nitrogen padding, oxygen bubbling tube, and computerized control system, including two RD10 controllers, as follows. Toluene (723.2 grams), 272.7 grams MPP, 37.2 grams TMBPA, 7.23 grams DMBA, 3.10 grams DBA, and a mixture of 0.49 grams DBEDA, 0.26 grams DDMAC, and 0.88 grams toluene were charged to the reactor, and stirred under nitrogen. A catalyst solution of 0.17 gram $Cu_2O$ in 2.15 gram 48% HBr was added to the above reaction mixture. After the addition of catalyst solution, oxygen flow was started. The temperature was ramped from 25° C. to 39.4° C. in 15 minutes, and at 70 minutes it was increased to 48.9° C. Oxygen flow was maintained for 130 minutes, at which point the flow was stopped, and 1.88 grams NTA and 5.41 grams water were added to the reaction mixture. The resulting mixture was stirred at 60° C. for 2 hours. The layers were separated by centrifugation and the light phase was isolated by removal of toluene. The copolymer was obtained after drying in a vacuum oven at 110° C. under nitrogen overnight. Chemical and physical properties of the copolymer are summarized in Table 2.

Preparative Example 2—Synthesis of Bifunctional 50/50 WT/WT DMP-MPP Copolymer

Toluene (241 grams), 36.05 grams MPP, 36.05 grams DMP, 12.40 grams TMBPA, 2.41 grams DMBA, 1.03 gram DBA, and a mixture of 0.16 gram DBEDA, 0.09 grams DDMAC, and 0.29 grams toluene were charged to a 500-mL jacketed glass reactor equipped with an overhead agitator and a dip tube for oxygen bubbling and stirred under nitrogen. A catalyst solution of 0.056 grams $Cu_2O$ in 0.72 grams 48% HBr was added to the above reaction mixture. After the addition of catalyst solution, oxygen flow was started. The temperature was ramped from 25° C. to 39.4° C. in 15 minutes, and at 70 minutes it was increased to 48.9° C. Oxygen flow was maintained for 130 minutes, at which point the flow was stopped, and 1.88 grams NTA and 5.41 grams water were added to the reaction mixture. The resulting mixture was stirred at 60° C. for 2 hours. The layers were separated by centrifugation and the light phase was isolated by removal of toluene. The copolymer was obtained after drying in a vacuum oven at 110° C. under nitrogen overnight. Chemical and physical properties of the copolymer are summarized in Table 2.

Characterization of Bifunctional Copolymers

The chemical structure and composition of the bifunctional copolymers were determined by $^1$H-NMR analysis. $^1$H-NMR spectra were acquired on a Varian Mercury Plus 400 instrument operating at an observe frequency of 400.14 MHz. Intrinsic viscosity (IV) of the bifunctional copolymers was measured using an Ubbelohde capillary type viscometer and stop watch. Different concentrations of bifunctional copolymers were prepared in chloroform and measurements were done at 25° C. in a thermostated water bath. The flow time data was used to calculate the intrinsic viscosity by extrapolating the reduced viscosity to zero concentration. Solution viscosity of the bifunctional copolymers was measured using a DV2+ pro Brookfield viscometer equipped with an UL adaptor for low viscosity materials. The measurements were conducted on 50 wt. % solutions of the bifunctional copolymers in MEK using spindle 00 at 25° C., with the temperature maintained by a water jacket. The glass transition temperatures, $T_g$, of the bifunctional copolymers were measured under nitrogen using a TA Instruments Differential Scanning Calorimeter from 30° C. to 200° C. at a 10° C./min temperature ramp. All sample weights were in the range of 15.0±5 milligrams. Dielectric properties of laminates were measured using a Hewlett Packard Parallel Plate RF impedance/material analyzer at 1 MHz to 1.8 GHz, equipped with a Hewlett Packard Dielectric Material test fixture model 16453A. Dielectric constant (D) and dissipation factor ($D_f$) at 1 GHz are reported in Table 2.

Chemical and physical properties of the bifunctional copolymers are summarized in Table 2. "$T_g$ (° C.) 1st scan" and "$T_g$ (° C.) 2nd scan" are glass transition temperatures measured by differential scanning calorimetry in first and second heating scans. "Absolute $M_n$ (g/mol)" is the absolute number average molecular weight, "Average functionality" is the average number of phenolic hydroxyl end groups per molecule, and "X;" is average degree of polymerization, i.e. the average number of MPP and/or DMP repeat units per molecule plus one TMBPA unit. These parameters were all determined by $^1$H-NMR spectroscopy. "Absolute $M_n$ (g/mol)" is based on the integrated areas under the resonance peaks in $^1$H-NMR spectra of the poly(phenylene ether) copolymers, which are proportional to the molar concentration of the species corresponding to the peaks. In particular, the determination of $M_n$ is equivalent to dividing the total weight of a given sample of the polymer (which is proportional to the total area under the $^1$H-NMR peak of species) by the total number of its constituent molecules. In other words, $M_n$ equals the sum of all component integrals multiplied by their molecular weight divided by the sum of all terminal component integrals divided by their number of equivalent protons and multiplied by two. The components for MPP/TMBPA copolymers include the TMBPA internal unit, TMBPA terminal unit, MPP repeat unit, MPP head unit, internal MPP biphenyl unit, MPP tail unit, and Mannich di-n-butylamino MPP head unit. The terminal components include TMBPA terminal unit, MPP head unit, MPP tail unit, and di-n-butylamino MPP head unit.

TABLE 2

| Property | SA90 PPE-DMP | PREP. EX. 1 PPE-MMP | PREP. EX. 2 PPE-DMP/MPP |
|---|---|---|---|
| Intrinsic Viscosity (dL/g) | 0.083 | 0.063 | 0.63 |
| Average functionality | 2.0 | 2.0 | 2.0 |
| Absolute $M_n$ (g/mol) | 1745 | 2932 | 2424 |
| $X_n$ | 12 | 15 | 14 |
| $T_g$ (° C.) 1st scan | 134 | 128 | 121 |
| $T_g$ (° C.) 2nd scan | 133 | 124 | 118 |

Solubility of DMP, MMP, and DMP/MPP copolymers in toluene, chloroform, MEK, and NMP are provided in Tables 3, 4 and 5, respectively. The solubility was determined according to a modified version of ASTM D3132-84, Standard Test Method of Solubility Range of Resins and Polymers (Reapproved 1996; Withdrawn 2005). Rather than testing solubility of a polymer in a variety of solvent compositions, as in ASTM D3132-84, solubility in a single solvent was determined. For example, to determine whether the solubility of the poly(phenylene ether) copolymer in the composition is at least 10 grams per kilogram of composition at 25° C., the following procedure was used. Poly(phenylene ether) copolymer (0.05 gram) was combined with solvent (4.95 grams) in a 15-milliliter cylindrical clear glass vial at 25° C. The vial is then closed with a screw cap and tumbled or rotated end-over-end at about one to five revolutions per minute for 24 to 48 hours at 25° C. At the end of 24 to 48 hours, the contents of the vial were visually inspected and classified as a complete solution (a single, clear liquid phase with no distinct solid or gel particles), a borderline solution (cloudy or turbid but without distinct phase separation), or insoluble (two phases; either a liquid with separate gel or solid phase or two separate liquids). If the contents of the vial were classified as a complete solution, then the poly(phenylene ether) copolymer is listed as soluble at 10 grams per kilogram at 25° C. in Table 3-5. As can be seen from Tables 3 and 4, the MPP copolymer has superior NMP-solubility to the DMP copolymer. While the DMP copolymer is insoluble in NMP, even at 10 wt. %0, the MPP copolymer is soluble at 60 wt. %.

TABLE 3

| PPE-DMP (wt. %) | 10 | 20 | 30 | 40 | 50 | 60 | 70 | 80 | 90 |
|---|---|---|---|---|---|---|---|---|---|
| Toluene | CE 1 sol. | CE 2 sol. | CE 3 sol. | CE 4 sol. | CE 5 sol. | CE 6 sol. | CE 7 insol. | CE 8 insol. | CE 9 insol. |
| $CHCl_3$ | CE 10 sol. | CE 11 sol. | CE 12 sol. | CE 13 sol. | CE 14 sol. | CE 15 insol. | CE 16 insol. | CE 17 insol. | CE 18 insol. |
| MEK | CE 19 sol. | CE 20 sol. | CE21 sol. | CE 22 sol. | CE 23 sol. | CE 24 insol. | CE 25 insol. | CE 26 insol. | CE 27 insol. |
| NMP | CE 28 insol. | CE 29 insol. | CE 30 insol. | CE 31 insol. | CE 32 insol. | CE 33 insol. | CE 34 insol. | CE 35 insol. | CE 36 insol. |

TABLE 4

| PPE-MMP (wt. %) | 10 | 20 | 30 | 40 | 50 | 60 | 70 | 80 | 90 |
|---|---|---|---|---|---|---|---|---|---|
| Toluene | E 1 sol. | E 2 sol. | E 3 sol. | E 4 sol. | E 5 sol. | E 6 sol. | E 7 insol. | E 8 insol. | E 9 insol. |
| $CHCl_3$ | E 10 sol. | E 11 sol. | E 12 sol. | E 13 sol. | E 14 sol. | E 15 sol. | E 16 insol. | E 17 insol. | E 18 insol. |
| MEK | E 19 sol. | E 20 sol. | E 21 sol. | E 22 sol. | E 23 sol. | E 24 sol. | E 25 insol. | E 26 insol. | E27 insol. |
| NMP | E 28 sol. | E 29 sol. | E 30 sol. | E 31 sol. | E 32 sol. | E 33 sol. | E 34 insol. | E 35 insol. | E36 insol. |

TABLE 5

| PPE-DMP/ MMP (wt. %) | 10 | 20 | 30 | 40 | 50 | 60 | 70 | 80 | 90 |
|---|---|---|---|---|---|---|---|---|---|
| Toluene | CE 37 sol. | CE 38 sol. | CE 39 sol. | CE 40 sol. | CE 41 sol. | CE 42 sol. | CE 43 insol. | CE 44 insol. | CE 45 insol. |
| $CHCl_3$ | CE 46 sol. | CE 47 sol. | CE 48 sol. | CE 49 sol. | CE 50 sol. | CE 51 insol. | E 52 insol. | CE 53 insol. | CE 54 insol. |
| MEK | CE 55 sol. | CE 56 sol. | CE 57 sol. | CE 58 sol. | CE 59 sol. | CE 60 insol. | CE 61 insol. | CE 62 insol. | CE 63 insol. |
| NMP | CE 64 sol. | CE 65 sol. | CE 66 sol. | CE 67 sol. | CE 68 sol. | CE 69 insol. | CE 70 insol. | CE 71 insol. | CE 72 insol. |

Table 6 summarizes the solution viscosity of DMP, MMP, and DMP/MPP copolymers at 50 wt. % in toluene, chloroform, MEK, and NMP. Surprisingly, for each solvent, MPP copolymers have much lower solution viscosity than DMP and DMP/MPP copolymers.

TABLE 6

| Copolymer | Example | Solvent | Temp. (° C.) | Rate (rpm) | Torque (%) | Viscosity (cP) |
|---|---|---|---|---|---|---|
| PPE-DMP | CE 5 | toluene | 25 | 10 | 45 | 236 |
| PPE-DMP | CE 14 | chloroform | 25 | 1 | 87.5 | 5330 |
| PPE-DMP | CE 23 | MEK | 25 | 20 | 42.4 | 136 |
| PPE-DMP | CE 32 | NMP | 25 | NA$^a$ | NA$^a$ | NA$^a$ |
| PPE-MPP | E 5 | toluene | 25 | 10 | 15.4 | 99.2 |
| PPE-MPP | E 14 | chloroform | 25 | 1 | 19.1 | 1233 |
| PPE-MPP | E 23 | MEK | 25 | 20 | 15.1 | 48.3 |
| PPE-MPP | E 32 | NMP | 25 | 1 | 30.8 | 1971 |
| PPE-DMP/MPP | CE 41 | toluene | 25 | 10 | 23.6 | 151 |
| PPE-DMP/MPP | CE 50 | chloroform | 25 | 1 | 30.0 | 1950 |
| PPE-DMP/MPP | CE 59 | MEK | 25 | 20 | 20.8 | 67 |
| PPE-DMP/MPP | CE 68 | NMP | 25 | 1 | 56.0 | 3590 |

$^a$Insoluble at 50 wt. % in NMP.

Preparation and Characterization of Laminates

On a heated stir plate, 35 wt. % of bifunctional copolymer was dissolved in MEK at 50° C. Once the bifunctional copolymer was completely dissolved, BPADGE was added. Once the MEK, bifunctional copolymer, and BPADGE formed a homogeneous solution, the solution was cooled to 30° C. and 2 parts per hundred resin of 2,4-EMI was added. Once dissolved, the solution was transferred to a pan and E-Glass fiberglass cloth was submerged in the solution to form a prepreg. Once fully wetted, the prepregs were air dried for 30 minutes and B-Staged for 3.0 minutes at 140° C. The prepregs were layered with copper foil on the top and bottom of the stack in a TEFLON™-coated aluminum foil pouch and cured for 3 hours at 200° C. on a PHI Laminate press. The compositions and dielectric performance of laminates composed of DMP and MPP copolymers (Comparative Example 73 and Example 37, respectively) are summarized in Table 7. The reported dielectric constants (Dk) and loss tangents (Df) are comparable to other epoxy laminates.

TABLE 7

| Composition | CE 73 | E 37 |
|---|---|---|
| DER 332 (wt. %) | 65 | 65 |
| PPE-DMP (wt. %) | 35 | — |
| PPE-MPP (wt. %) | — | 35 |
| 2,4-EMI (phr) | 2 | 2 |
| Resin Solids (wt. %) | 43.8 | 34.5 |
| Tacky | no | no |
| Dk (1 GHz, 2 layer) | 3.45 | 3.33 |
| Df (1 GHz, 2 layer) | 0.002 | 0.001 |

This disclosure is further illustrated by the following embodiments, which are not intended to limit the claims.

Embodiment 1. A composition comprising: a poly(phenylene ether) copolymer derived from monomers comprising 2-methyl-6-phenylphenol and a dihydric phenol; and a non-halogenated solvent; wherein the monomers comprise, based on the total weight of monomers, less than 0.5 weight percent of monohydric phenols having identical substituents in the 2- and 6-positions of the phenolic ring; and wherein the copolymer has an absolute number average molecular weight of 1,000 to 10,000 grams/mole.

Embodiment 2. A composition comprising: a poly(phenylene ether) copolymer derived from monomers comprising 2-methyl-6-phenylphenol, 2,6-dimethylphenol, and a dihydric phenol; and a non-halogenated solvent; wherein the copolymer has an absolute number average molecular weight of 1,000 to 5,000 grams/mole.

Embodiment 3. The composition of embodiment 1, comprising: 15 to 80 weight percent of the poly(phenylene ether) copolymer; and 20 to 85 weight percent of the non-halogenated solvent, based on the total weight of the poly(phenylene ether) copolymer and the non-halogenated solvent.

Embodiment 4. The composition of any of embodiments 1 to 3, wherein the dihydric phenol has the structure:

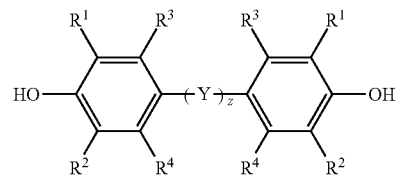

wherein each occurrence of $R^1$ and $R^2$ and $R^3$ and $R^4$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; z is 0 or 1; and Y is:

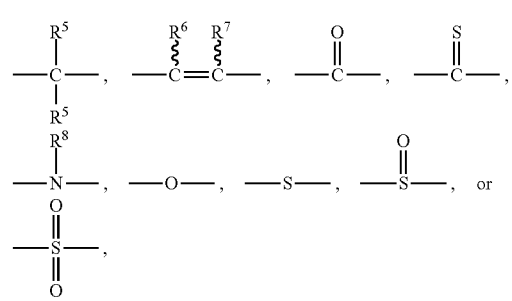

wherein each occurrence of $R^5$-$R^8$ is independently hydrogen, $C_1$-$C_{12}$ hydrocarbyl, or $C_1$-$C_6$, hydrocarbylene wherein the two occurrences of $R^5$ collectively form a $C_4$-$C_{12}$ alkylene group.

Embodiment 5. The composition of embodiment 4, wherein z is 1.

Embodiment 6. The composition of any of embodiments 1 to 5, wherein the dihydric phenol comprises 2,2-bis(3,5-dimethyl-4-hydroxyphenol)propane.

Embodiment 7. The composition of any of embodiments 1 and 3 to 6, wherein the copolymer has the structure:

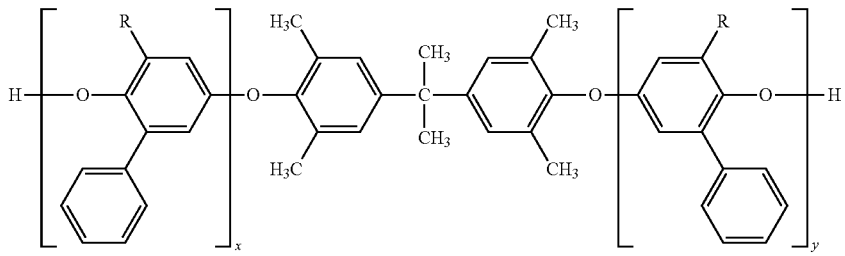

wherein: R is independently at each occurrence methyl or di(n-butyl)aminomethyl; provided that the copolymer comprises, on average, less than or equal to 0.005 weight percent of di(n-butyl)aminomethyl groups, based on the weight of the copolymer; and x and y are independently integers from zero to 50, provided that the sum of x plus y is 4 to 53.

Embodiment 8. The composition of embodiment 7, wherein the sum of x and y in the copolymer is 8 to 20.

Embodiment 9. The composition of any of embodiments 1 to 8, wherein the absolute number average molecular weight is 1,000 to 3,000 grams/mole.

Embodiment 10. The composition of any of embodiments 1 to 9, wherein the non-halogenated solvent comprises $C_3$-$C_8$ ketones, $C_4$—C N,N-dialkylamides, $C_4$-$C_{16}$ dialkyl ethers, $C_6$-$C_{12}$ aromatic hydrocarbons, $C_3$-$C_6$ alkyl alkanoates, $C_2$-$C_6$ alkyl nitriles, $C_2$-$C_6$ dialkyl sulfoxides, or a combination comprising at least one of the foregoing.

Embodiment 11. The composition of any of embodiments 1 to 10, wherein the non-halogenated solvent comprises acetone, methyl ethyl ketone, N-methyl-2-pyrrolidone, toluene, or a combination comprising at least one of the foregoing.

Embodiment 12. The composition of embodiment 11, wherein the poly(phenylene ether) copolymer has a solubility of at least 100 grams per kilogram, based on the total weight of the copolymer and non-halogenated solvent, at 25° C.

Embodiment 13. The composition of embodiment 11 or 12, wherein the poly(phenylene ether) copolymer has a solubility of 100 to 700 grams per kilogram, based on the total weight of the copolymer and non-halogenated solvent, at 25° C.

Embodiment 14. A curable composition, comprising a thermoset resin and the composition of any of embodiments 1 to 13.

Embodiment 15. The curable composition of embodiment 14, wherein the thermoset resin comprises a epoxy resin and the composition is free of coreactive curing agent other than the poly(phenylene ether) copolymer.

Embodiment 16. The curable composition of embodiment 15, comprising: 20 to 99 weight percent of the epoxy resin; and 1 to 80 weight percent of the poly(phenylene ether) copolymer, based on the total weight of the thermoset resin and the poly(phenylene ether) copolymer.

Embodiment 17. A cured composition obtained by heating the curable composition of any of embodiments 14 to 16 for a time and temperature sufficient to evaporate the non-halogenated solvent and effect curing.

Embodiment 18. A method of forming a composite, comprising: impregnating a reinforcing structure with the curable composition of any of embodiments 14 to 16; removing at least a portion of the non-halogenated solvent from the curable composition and effecting partial cure to form a prepreg; and laminating and curing a plurality of the prepregs.

Embodiment 19. A composite formed by the method of embodiment 18.

Embodiment 20. A printed circuit board comprising the composite of embodiment 19.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Compounds are described using standard nomenclature. For example, any position not substituted by any indicated group is understood to have its valences filled by a bond as indicated, or a hydrogen atom. A dash ("-") that is not between two letters or symbols is used to indicate a point of attachment for a substituent. For example, —CHO is attached through the carbon atom of the carbonyl group.

The term "hydrocarbyl" refers to a monovalent group containing carbon and hydrogen. Hydrocarbyl can be alkyl, cycloalkyl, alkenyl, cycloalkenyl, aryl, alkylaryl, or arylalkyl as defined below. The term "hydrocarbylene" refers to a divalent group containing carbon and hydrogen. Hydrocarbylene can be alkylene, cycloalkylene, arylene, alkylarylene, or arylalkylene as defined below. The term "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl (—HC=CH$_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene (—CH$_2$—) or, propylene (—(CH$_2$)$_3$—)). "Cycloalkylene" means a divalent cyclic alkylene group, —C$_n$H$_{2-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentenyl and cyclohexenyl). "Aryl" means an aromatic hydrocarbon group containing the specified number of carbon atoms, such as phenyl, tropone, indanyl, or naphthyl. "Arylene" means a divalent aryl group. "Alkylarylene" means an arylene group substituted with an alkyl group. "Arylalkylene" means an alkylene group substituted with an aryl group. The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P. The suffix "oxy" indicates that the open valence of the group is on an oxygen atom and the suffix "thio" indicates that the open valence of the group is on a sulfur atom.

Unless substituents are otherwise specifically indicated, each of the foregoing groups can be unsubstituted or substituted, provided that the substitution does not significantly adversely affect synthesis, stability, or use of the compound. "Substituted" means that the compound, group, or atom is substituted with at least one (e.g., 1, 2, 3, or 4) substituents instead of hydrogen, where each substituent is independently nitro (—NO$_2$), cyano (—CN), hydroxy (—OH), halogen, thiol (—SH), thiocyano (—SCN), C$_{1-6}$ alkyl, C$_{2-6}$ alkenyl, C$_{2-6}$ alkynyl, C$_{1-6}$ haloalkyl, C$_{1-9}$ alkoxy, C$_{1-6}$ haloalkoxy, C$_{3-12}$ cycloalkyl, C$_{5-18}$ cycloalkenyl, C$_{6-12}$ aryl, C$_{7-13}$ arylalkylene (e.g., benzyl), C$_{7-12}$ alkylarylene (e.g, toluyl), C$_{4-12}$ heterocycloalkyl, C$_{3-12}$ heteroaryl, C$_{1-6}$ alkyl sulfonyl (—S(=O)$_2$-alkyl), C$_{6-12}$ arylsulfonyl (—S(=O)$_2$-aryl), or tosyl (CH$_3$C$_6$H$_4$SO$_2$—), provided that the normal valence of the substituted atom is not exceeded, and that the substitution does not significantly adversely affect the manufacture, stability, or desired property of the compound. When a compound is substituted, the indicated number of carbon atoms is the total number of carbon atoms in the compound or group, including those of any substituents.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A composition comprising:
   a poly(phenylene ether) copolymer derived from monomers comprising 2-methyl-6-phenylphenol and a dihydric phenol; and
   a non-halogenated solvent;
   wherein the monomers comprise, based on the total weight of monomers, less than 0.5 weight percent of monohydric phenols having identical substituents in the 2- and 6-positions of the phenolic ring; and
   wherein the copolymer has an absolute number average molecular weight of 1,000 to 10,000 grams/mole.

2. The composition of claim 1, wherein the copolymer has an absolute number average molecular weight of 1,000 to 5,000 grams/mole.

3. The composition of claim 1, comprising:
   15 to 80 weight percent of the poly(phenylene ether) copolymer; and
   20 to 85 weight percent of the non-halogenated solvent, based on the total weight of the poly(phenylene ether) copolymer and the non-halogenated solvent.

4. The composition of claim 1, wherein the dihydric phenol has the structure:

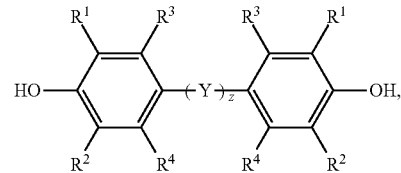

wherein each occurrence of R$^1$ and R$^2$ and R$^3$ and R$^4$ is independently hydrogen, halogen, unsubstituted or substituted C$_1$-C$_{12}$ hydrocarbyl provided that the hydrocarbyl group is not tertiary hydrocarbyl, C$_1$-C$_{12}$ hydrocarbylthio, C$_1$-C$_{12}$ hydrocarbyloxy, or C$_2$-C$_{12}$ halohydrocarbyloxy wherein at least two carbon atoms separate the halogen and oxygen atoms; z is 0 or 1; and Y is:

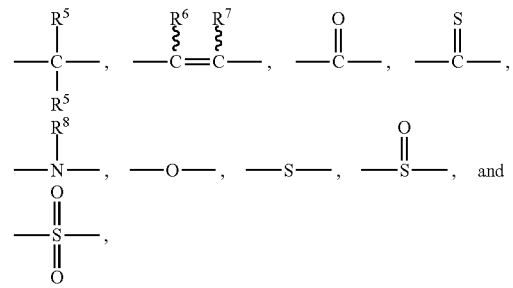

wherein each occurrence of R$^5$-R$^8$ is independently hydrogen, C$_1$-C$_{12}$ hydrocarbyl, or C$_1$-C$_6$ hydrocarbylene wherein the two occurrences of R$^5$ collectively form a C$_4$-C$_{12}$ alkylene group.

5. The composition of claim 4, wherein z is 1.

6. The composition of claim 1, wherein the dihydric phenol comprises 2,2-bis(3,5-dimethyl-4-hydroxyphenol) propane.

7. The composition of claim 1, wherein the copolymer has the structure:

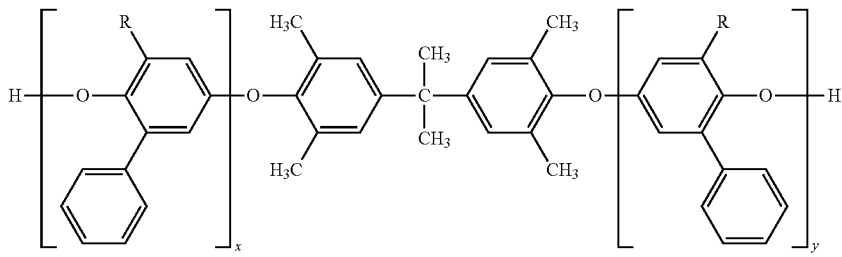

wherein:
R is independently at each occurrence methyl or di(n-butyl)aminomethyl; provided that the copolymer comprises, on average, less than or equal to 0.005 weight percent of di(n-butyl)aminomethyl groups, based on the weight of the copolymer; and
x and y are independently integers from zero to 50, provided that the sum of x plus y is 4 to 53.

8. The composition of claim 7, wherein the sum of x and y in the copolymer is 8 to 20.

9. The composition of claim 1, wherein the absolute number average molecular weight is 1,000 to 3,000 grams/mole.

10. The composition of claim 1, wherein the non-halogenated solvent comprises $C_3$-$C_8$ ketones, $C_4$-$C_8$ N,N-dialkylamides, $C_4$-$C_{16}$ dialkyl ethers, $C_6$-$C_{12}$ aromatic hydrocarbons, $C_3$-$C_6$ alkyl alkanoates, $C_2$-$C_6$ alkyl nitriles, $C_2$-$C_6$ dialkyl sulfoxides, or a combination comprising at least one of the foregoing.

11. The composition of claim 1, wherein the non-halogenated solvent comprises acetone, methyl ethyl ketone, N-methyl-2-pyrrolidone, toluene, or a combination comprising at least one of the foregoing.

12. The composition of claim 11, wherein the poly(phenylene ether) copolymer has a solubility of at least 100 grams per kilogram, based on the total weight of the copolymer and non-halogenated solvent, at 25° C.

13. The composition of claim 11, wherein the poly(phenylene ether) copolymer has a solubility of 100 to 700 grams per kilogram, based on the total weight of the copolymer and non-halogenated solvent, at 25° C.

14. A curable composition, comprising a thermoset resin and the composition of claim 1.

15. The curable composition of claim 14, wherein the thermoset resin comprises a epoxy resin and the composition is free of coreactive curing agent other than the poly(phenylene ether) copolymer.

16. The curable composition of claim 15, comprising:
20 to 99 weight percent of the epoxy resin; and
1 to 80 weight percent of the poly(phenylene ether) copolymer,
based on the total weight of the thermoset resin and the poly(phenylene ether) copolymer.

17. A cured composition obtained by heating the curable composition of claim 14 for a time and temperature sufficient to evaporate the non-halogenated solvent and effect curing.

18. A method of forming a composite, comprising:
impregnating a reinforcing structure with the curable composition of claim 14;
removing at least a portion of the non-halogenated solvent from the curable composition and effecting partial cure to form a prepreg; and
laminating and curing a plurality of the prepregs.

19. A composite formed by the method of claim 18.

20. A printed circuit board comprising the composite of claim 19.

* * * * *